Patented May 8, 1928.

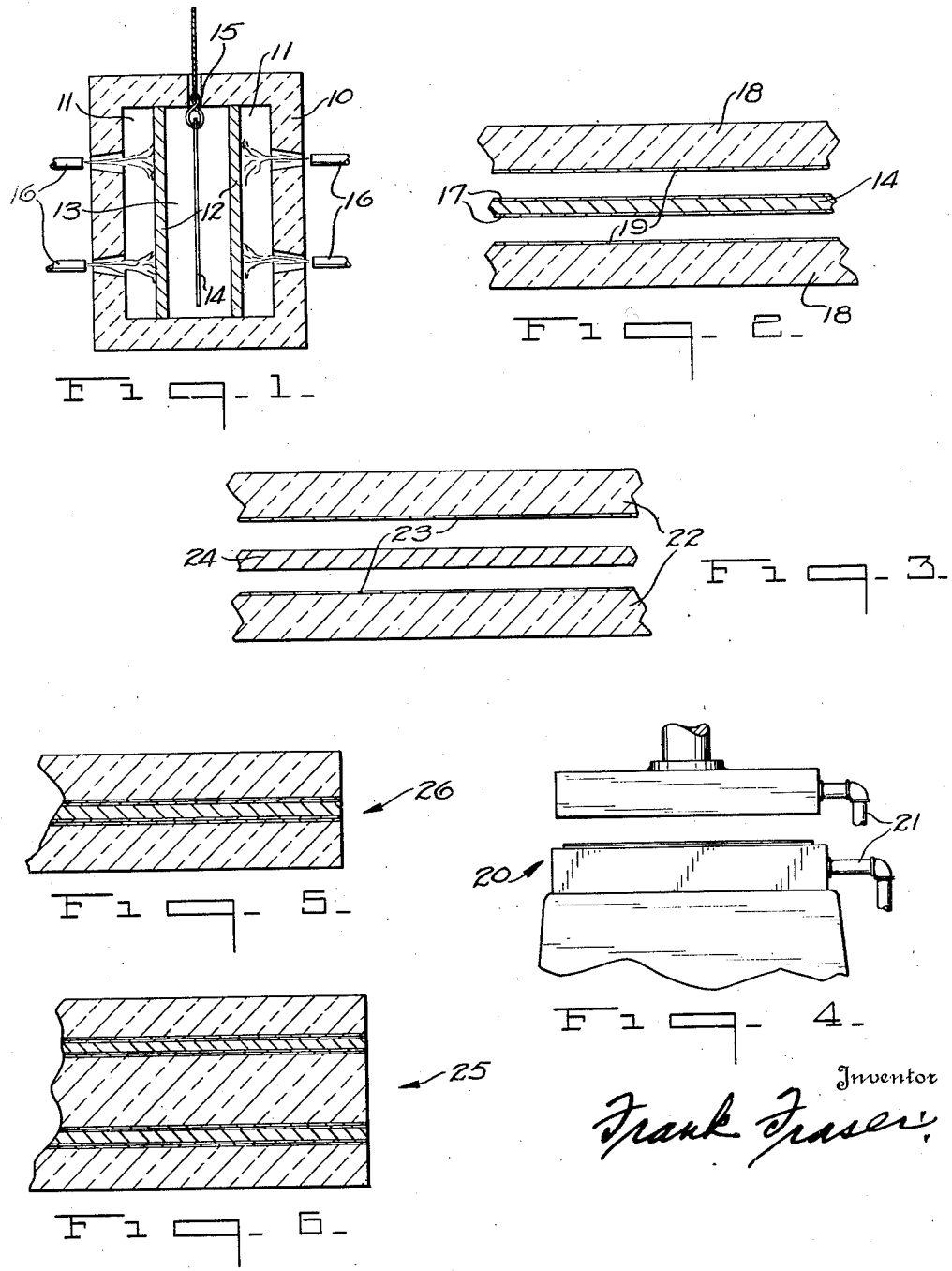

1,669,044

UNITED STATES PATENT OFFICE.

FRANK FRASER, OF TOLEDO, OHIO, ASSIGNOR TO THE LIBBEY-OWENS SHEET GLASS COMPANY, OF TOLEDO, OHIO, A CORPORATION OF OHIO.

LAMINATED GLASS.

Application filed June 30, 1926. Serial No. 119,551.

The present invention relates to laminated glass, and to the process of producing the same.

An important object of the invention is to provide a process of producing, as a new article of manufacture, a sheet of laminated glass, and relates particularly to the joining of a sheet of glass and a sheet of non-brittle material, the sheet of non-brittle material containing a liquid which is brought to the surface to form a film to assist in creating an effective and permanent bond between the two sheets.

Another object of the invention is to provide, in the process of producing laminated glass, a sheet of glass having a skin formed thereon and a sheet of non-brittle material such as a cellulose composition material or the like containing a relatively large amount of oil, the process contemplating a treatment of the said non-brittle sheet in a manner to produce a film of oil by bringing the oil out from the body of said sheet, the oil being used to assist in creating an efficient bond between the sheet of non-brittle material and the skin on said sheet of glass.

Still another object of the invention is to provide a sheet of cellulose composition material or the like including a relatively large percent of vegetable oil, such as castor oil, which can be brought to the surface of said sheet to form a film thereon, and then combining said sheet and film of oil to a sheet of glass, preferably uniting the same under the action of heat and pressure.

Other objects and advantages of the invention will become apparent during the course of the following description.

In the drawings wherein like numerals are employed to designate like parts throughout the same, Fig. 1 is a sectional view of the apparatus which may be used to treat my improved form of non-brittle material before it is laminated, Fig. 2 illustrates in section the laminations after they have been treated and before they have been united, Fig. 3 is a similar view illustrating a slightly modified form of process, Fig. 4 is a diagrammatic representation of a form of press which may be used to unite the laminations, Fig. 5 is a sectional view of the finished product, and Fig. 6 is a similar view of a slightly modified form of product.

Heretofore, in the production of laminated glass, it has been customary to unite a plurality of sheets of glass and a sheet of non-brittle material such as a cellulose composition material. One of the difficulties in producing laminated glass resides in the fact that the bond between the various laminations is not permanent so that the effective protective life of said sheet of laminated glass is relatively short.

In the present invention the sheet of non-brittle material used, which may be any of the cellulose composition material family, or the like, is impregnated or formed in such a manner that a relatively large amount of some liquid is contained therein, the liquid being of such a nature that it can be brought to the surface of said sheet in a manner to form a film. The invention contemplates the use of any suitable liquid such as an oil including vegetable oils, such as castor oil. The liquid used may constitute a part of the original batch used in the manufacture of the non-brittle sheet, or the sheet may be formed and then reworked to include the desired liquid.

In the drawings the numeral 10 designates a chamber including compartments 11 formed by the walls 12, the walls 12 being arranged in spaced relation, forming a compartment 13 in which a sheet of non-brittle material 14 may be heated. The sheet may be supported and moved by any suitable clip means or the like 15. Heating means 16 may be provided to heat the chambers 11. The sheet of non-brittle material 14 may be preheated in this manner to bring the liquid, or a portion thereof, to the surface forming a film 17, as indicated in Fig. 2. The numeral 18 designates a sheet of glass, preferably transparent, either one or both of whose surfaces may be ground and polished depending upon the use to which the finished product is to be put. In following out the process a suitable transparent skin 19 is formed on said sheet of glass. This skin may be formed by dissolving a cellulose composition material or the like, spraying or otherwise applying the resulting solution upon the sheet of glass, permitting the solvent or the greater portion thereof to evaporate, thus leaving a comparatively dry skin of material on the sheet. By forming such a skin on the glass, I believe that a better bond can be had between the non-brittle sheet and the glass sheet. Similar skins may be formed on the non-brittle sheet if desired.

After the skin has been formed on the sheet of glass and the film of oil has been brought to the surface of the non-brittle sheet, the laminations may be superimposed as indicated in Fig. 2, placed in a press designated in its entirety by the numeral 20, and subjected to the action of heat and pressure to cause an intimate adhesion therebetween. Means 21 may be provided to circulate a heating medium through those portions of the press contacting with the laminations. The press is preferably so constructed that pressure is initially exerted centrally of the laminations so that excess liquid will be expelled from between said laminations. After the laminations have been subjected to sufficient heat and pressure, the sheet may be removed from the press, permitted to cool, and then placed into any desired use. A sheet of glass constructed in this manner will withstand considerable shock, and if in the event the glass sheets become fractured the bond between said sheets and non-brittle sheet will be such that the fragments of glass will remain adhered to said non-brittle sheet.

In Fig. 3 is shown diagrammatically a slightly modified process wherein the sheets of glass 22 are each provided with a skin 23 similar to the manner in which the skin 19 is applied to the sheets 18 in Fig. 2. The numeral 24 designates a sheet of non-brittle material containing a liquid such as a vegetable oil, but which has not been preheated as in Fig. 1 to produce a film on its surfaces. In this particular process, the three laminations are placed in superimposed relation in the press 20 where the heat generated is used to bring the film of oil required to the surfaces of said non-brittle sheet. In either event, sufficient liquid will be present to assist in obtaining a good bond between the laminations.

Although the process has been described as relying upon heat and pressure to bring the liquid to the surfaces of said non-brittle sheet, it is to be understood that the invention also includes the application of any substance to the surfaces of said non-brittle sheet to bring a film outwardly from the body of said sheet.

Fig. 5 clearly shows in section the sheet produced by the laminations indicated in Figs. 2 and 3. Of course, it will be understood that the films of oil illustrated are exaggerated, as the amount of liquid remaining in the finished sheet will be relatively very little.

Fig. 6 represents a sheet of so-called bullet proof glass 25 which is formed in exactly the same manner as the thinner sheet 26.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass including a sheet of non-brittle material impregnated with a liquid capable of forming a film on said sheet.

2. As a new article of manufacture, a sheet of laminated glass including a non-brittle sheet impregnated with an oil.

3. As a new article of manufacture, a sheet of laminated glass including a sheet of non-brittle material impregnated with a vegetable oil.

4. As a new article of manufacture, a sheet of laminated glass including a sheet of non-brittle material impregnated with castor oil.

5. As a new article of manufacture, a sheet of laminated glass comprising a sheet of glass and a sheet of non-brittle material, said sheet of non-brittle material being united thereto and containing a liquid which is brought to the surface of said sheet to form a film for assisting in creating a bond between said sheets.

6. As a new article of manufacture, a sheet of laminated glass comprising a sheet of glass and a sheet of non-brittle material united thereto, said sheet of non-brittle material containing an oil which is brought to the surface thereof to form a film for assisting in creating a bond between said sheets.

7. As a new article of manufacture, a sheet of laminated glass comprising a sheet of glass and a sheet of non-brittle material united thereto, said sheet of non-brittle material containing a relatively large amount of castor oil which is brought to the surface thereof to form a film for assisting in creating a bond between said sheets.

8. As a new article of manufacture, a sheet of laminated glass comprising a sheet of glass and a sheet of cellulose composition material containing a relatively large amount of vegetable oil.

9. As a new article of manufacture, a sheet of laminated glass comprising a sheet of glass and a sheet of cellulose composition material containing a relatively large amount of castor oil.

10. As a new article of manufacture, a sheet of laminated glass comprising a sheet of glass, a skin of cellulose composition material thereon and a sheet of non-brittle material united to said skin by the aid of oil brought to the surface of said non-brittle sheet from its body.

11. As a new article of manufacture, a sheet of laminated glass comprising a sheet of glass, a skin of cellulose composition material thereon and a sheet of cellulose composition material united to said skin with the aid of a film of castor oil brought to the surface of said sheet from its body.

12. The process of producing laminated glass consisting in uniting a sheet of glass with a sheet of non-brittle material containing a liquid which is brought to the surface thereof to cause a good bond between said sheets.

13. The process of producing laminated glass consisting in producing a sheet of non-brittle material containing a relatively large amount of oil, treating said sheet to bring a film of oil to the surface thereof, and then combining the same with a sheet of glass.

14. The process of producing laminated glass consisting in producing a sheet of non-brittle material containing a relatively large amount of oil, treating said sheet to bring a film of oil to the surface thereof, and then combining the same with a sheet of glass under the action of heat and pressure.

15. The process of producing laminated glass consisting in producing a sheet of cellulose composition material containing a relatively large amount of vegetable oil, treating said sheet to bring a film of said oil to the surface thereof, and then combining the same with a sheet of glass.

Signed at Toledo, in the county of Lucas and State of Ohio, this 28th day of June 1926.

FRANK FRASER.